(12) United States Patent
McDougal et al.

(10) Patent No.: US 8,787,567 B2
(45) Date of Patent: Jul. 22, 2014

(54) SYSTEM AND METHOD FOR DECRYPTING FILES

(75) Inventors: Monty D. McDougal, St. Paul, TX (US);
Randy S. Jennings, Plano, TX (US);
William E. Sterns, Wylie, TX (US)

(73) Assignee: Raytheon Company, Waltham, MA (US)

( * ) Notice: Subject to any disclaimer, the term of this patent is extended or adjusted under 35 U.S.C. 154(b) by 341 days.

(21) Appl. No.: 13/031,948

(22) Filed: Feb. 22, 2011

(65) Prior Publication Data
US 2012/0216046 A1    Aug. 23, 2012

(51) Int. Cl.
*G06F 21/00*    (2013.01)

(52) U.S. Cl.
USPC ............... 380/30; 713/156; 713/190; 726/6; 380/259; 380/286

(58) Field of Classification Search
USPC ........................................................ 380/30
See application file for complete search history.

(56) References Cited

U.S. PATENT DOCUMENTS

| | | | | |
|---|---|---|---|---|
| 5,491,752 A * | 2/1996 | Kaufman et al. | ............... | 380/30 |
| 5,850,448 A * | 12/1998 | Ganesan | ............... | 713/184 |
| 6,029,195 A * | 2/2000 | Herz | ............... | 725/116 |
| 7,269,261 B1 * | 9/2007 | Jennings | ............... | 380/286 |
| 7,599,492 B1 | 10/2009 | Malyshev et al. | | |
| 7,702,107 B1 * | 4/2010 | Messing | ............... | 380/259 |
| 7,929,707 B1 | 4/2011 | Belenko | | |
| 8,001,603 B1 * | 8/2011 | Kennedy | ............... | 726/24 |
| 2004/0128498 A1 * | 7/2004 | Lang et al. | ............... | 713/153 |
| 2005/0120233 A1 * | 6/2005 | Halcrow et al. | ............... | 713/193 |
| 2006/0036764 A1 * | 2/2006 | Yokota et al. | ............... | 709/240 |
| 2006/0190606 A1 * | 8/2006 | Kohavi | ............... | 709/226 |
| 2008/0052525 A1 | 2/2008 | Botchek | | |
| 2008/0222734 A1 * | 9/2008 | Redlich et al. | ............... | 726/26 |
| 2009/0265769 A1 * | 10/2009 | Lu et al. | ............... | 726/6 |
| 2009/0319529 A1 * | 12/2009 | Bartlett et al. | ............... | 707/9 |
| 2010/0036813 A1 * | 2/2010 | Cameron et al. | ............... | 707/3 |
| 2010/0180027 A1 * | 7/2010 | Drako | ............... | 709/225 |
| 2011/0107101 A1 * | 5/2011 | Funk | ............... | 713/170 |
| 2013/0298209 A1 * | 11/2013 | Targali et al. | ............... | 726/6 |

OTHER PUBLICATIONS

Borisov et al. "Intercepting mobile communications: the insecurity of 802.11." Proceedings of the 7th annual international conference on Mobile computing and networking. ACM, 2001, pp. 180-188.*
Klein, "'Foiling the Cracker': A survey of, and improvements to, password security", Proceedings of the 2nd USENIX Security Workshop, 1990, 11 pages.*

* cited by examiner

*Primary Examiner* — Morshed Mehedi
(74) *Attorney, Agent, or Firm* — Schwegman, Lundberg & Woessner, P.A.

(57) ABSTRACT

In accordance with particular embodiments, a computer-implemented method for execution by one or more processors includes intercepting a communication comprising a message. The method also includes identifying words from within the message. The method further includes storing in a dictionary words from within the message of the communication and one or more parameters of the communication for each of the words. The dictionary comprises a plurality of words from a plurality of intercepted text-based communications. The method also includes receiving an encrypted file that is configured to be decrypted using a password. The method additionally includes identifying words from the dictionary to be used to attempt to decrypt the encrypted file. The identified words are identified based on at least one parameter associated with the encrypted file and the one or more parameters stored in the dictionary. The method further includes attempting to decrypt the encrypted file using at least a portion of the identified words from the dictionary as the password for decrypting the encrypted attachment.

33 Claims, 4 Drawing Sheets

SYSTEM AND METHOD FOR DECRYPTING FILES

TECHNICAL FIELD

This disclosure relates generally to computer security and more particularly to a system and method for decrypting files.

BACKGROUND

One technique used to mask malicious software is to encrypt a file that includes the malicious software. Traditional software security measures (e.g., firewalls, spyware and malware filters, antivirus software, etc.) are often unable to identify the malicious software because of the encryption. In some cases, the encrypted file that includes the malicious software may be decrypted using a password that is given to the recipient of the file. When the recipient enters the password and decrypts the file, the malicious code often has already successfully survived pertinent security measures and is able to perform its nefarious task.

SUMMARY

In accordance with particular embodiments, a computer-implemented method for execution by one or more processors includes intercepting a communication comprising a message. The method also includes identifying one or more words from within the message. The method further includes storing in a dictionary one or more words from within the message of the communication, the dictionary comprising a plurality of words from a plurality of intercepted text-based communications. The method additionally includes storing in the dictionary one or more parameters of the communication for each of the one or more words stored in the dictionary. The method also includes receiving an encrypted file that is configured to be decrypted using a password. The method additionally includes identifying one or more words from the dictionary to be used to attempt to decrypt the encrypted file. The one or more identified words are identified based on at least one parameter associated with the encrypted file and the one or more parameters stored in the dictionary. The method further includes attempting to decrypt the encrypted file using at least a portion of the one or more identified words from the dictionary as the password for decrypting the encrypted attachment.

Depending on the specific features implemented, particular embodiments may exhibit some, none, or all of the following technical advantages. Files encrypted using a password may be decrypted automatically. The decrypted file may then be scanned to determine if it contains malicious or unwanted program code. Accordingly, certain embodiments may make it difficult or impossible for malicious code to slip past security software simply by being encrypted.

BRIEF DESCRIPTION OF THE DRAWINGS

For a more complete understanding of particular embodiments and their advantages, reference is now made to the following description, taken in conjunction with the accompanying drawings, in which.

DETAILED DESCRIPTION OF EXAMPLE EMBODIMENTS

Figure 1:
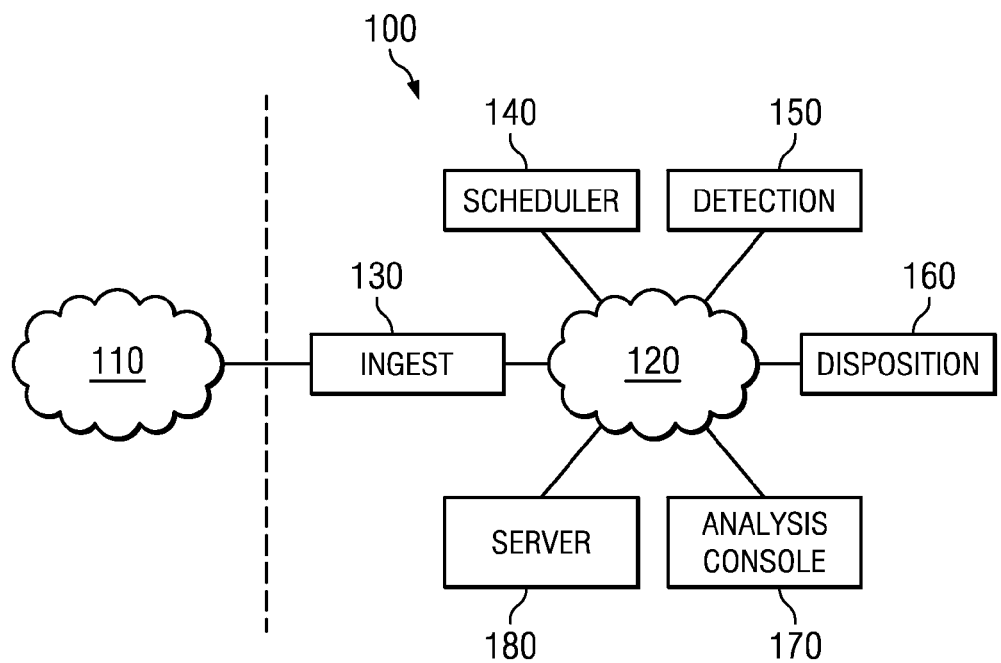
FIG. 1 is a block diagram illustrating one embodiment of a system that is operable to decrypt encrypted files.

FIG. 1 is a block diagram illustrating one embodiment of system 100 that is operable to decrypt encrypted files. The block diagram includes external network 110 and internal network 120. Internal network 120 couples ingest block 130, scheduler block 140, detection block 150, disposition block 160, analysis console block 170 and server block 180. Although this particular implementation of system 100 is depicted and primarily described, the present disclosure contemplates any suitable implementation of system 100, according to particular embodiments.

Blocks 130-180 may be configured to decrypt symmetrically encrypted files (e.g., password protected files) using one or more dynamic dictionaries. The dynamic dictionaries are created from intercepted communications and prioritized based on the communication containing the encrypted file and/or properties of the encrypted file. For example, in certain embodiments, incoming communications may be intercepted and any text in their message may be parsed into words. The words may be stored in one or more dictionaries along with meta data associated with each word. When a symmetrically encrypted file is received for decryption and analysis, the meta data associated with the words may be used to prioritize the words in one or more dictionaries. The prioritized words may then be applied to the encrypted file in the order of priority. For example, if an intercepted communication contains an encrypted file, words from the intercepted communication may be given a higher priority over other words in the dictionary. This type of prioritization takes advantage of the notion that the sender of an encrypted file containing malicious code wants the recipient to be able to open the file, thus will often include the password in the same communication as the encrypted file. Applying similar reasoning, the words from communications sent by the same sender one or two communications before or after the communication with the encrypted file may be given a higher priority. In some embodiments, the farther an intercepted communication is from the communication comprising the encrypted file, the closer the words of the communication may be to a standard priority.

By being coupled to internal network 120, blocks 130-180 may communicate with each other. In various embodiments, communication between blocks 130-180 utilizing internal network 120 may be indirect. For example, one or more of blocks 130-180 may be in a demilitarized zone (DMZ) that may limit direct communication between blocks 130-180. In various embodiments, blocks 130-180 may represent hardware, encoded software or a combination of the two. Blocks 130-180 may be implemented on the same or different hardware in various suitable combinations. Further details regarding the implementation and/or operation of blocks 130-180 may be determined by referencing FIGS. 2-6 and their accompanying descriptions below.

Networks 110 and 120, in some embodiments, may be communicative platforms operable to exchange data or information. In various embodiments, the networks may include packet data networks offering communication interfaces or exchanges between any two nodes in system 100. Networks 110 and 120 may each be or include any local area network (LAN), metropolitan area network (MAN), wide area network (WAN), wireless local area network (WLAN), virtual private network (VPN), intranet, Internet, plain old telephone system (POTS), or any other appropriate architecture or system that facilitates communications in a network or telephonic environment, including a combination of any networks or systems described above. The networks may also include wireless technology such as WiMAX, LTE, or any of a variety of cellular data networks. In various embodiments, networks 110 and 120 may each include firewalls or other equipment or encoded software that create security zones and/or secure networks such as DMZs. One or more of blocks 130-180 may be located in one more of such security zones and/or secure networks in some embodiments. For example, analysis console 170 may be in a DMZ that is separate from ingest block 130 and detection block 150. As another example, ingest block 130 may be in a different security zone than detection block 150.

As described above, embodiments of the present invention are operable to decrypt encrypted files. In particular, embodiments of the present invention are operable to decrypt files in which the encryption is based on a password. For purposes of this disclosure, a file (e.g., the file that is encrypted) may include one or more of the following in any suitable combination: (1) a data file; (2) a data record; (3) an email message; (4) an attachment to an email message; (5) a Uniform Resource Locator (URL) or other suitable address identifier; and (6) any other suitable target object for which decryption and malicious code detection may be appropriate. Decrypting encrypted files may have a variety of applications including enforcing one or more company, section, or individual policies. For example, it may be desirable to decrypt files attached to incoming communications, such as emails, chat sessions, or any other form of electronic communication, to assess whether the attached filed contains malicious code. As another example, it may be desirable to decrypt files attached to outgoing communications, such as emails, chat sessions, or any other form of electronic communication, to assess whether sensitive materials (e.g., trade secrets, classified documents) are being sent.

In operation, in various embodiments, ingest block 130 may receive an encrypted file or set of encrypted files from network 110. In some embodiments, an encrypted file may include several files embedded within the file. For example, an encrypted ZIP file or other archive or compressed file type, may be received by ingest block 130. Ingest block 130 may extract and cause the files that are contained within the received encrypted ZIP file to be analyzed. Ingest block 130 may analyze an incoming file and determine that the file is an encrypted file. Depending on the embodiment and/or scenario, ingest block 130 may also determine whether the encryption is based on a password or ingest block 130 may determine one or more tests that may be performed on the file in order to determine whether the file is encrypted based on a password. In some embodiments, detection block 150 may perform the test(s) that were determined by ingest block 130 in accordance with scheduling performed by scheduler block 140. Detection block 150 may also attempt to decrypt the file using a dynamically created dictionary of words. Disposition block 160 may utilize the results of the tests performed by detection block 150 to determine what should be done with the file. In some cases, disposition block 160 will send the file to analysis console 170 for further review by a human analyst.

In some embodiments, when ingest block 130 receives a communication that does not contain an encrypted file, it may direct the contents of the communication (e.g., the message) be added to a dynamic dictionary used to decrypt encrypted files. In certain embodiments, the text of a message may be analyzed to determine which string of characters (including spaces, punctuation, symbols, etc.) should be grouped together to form a word. In some embodiments, a word may comprise a string of characters that appear to be set-off from the other characters. For example, a word may comprise a phrase enclosed within quotation marks (e.g., "Your Password" may be considered a word). In addition to identifying words, certain embodiments may include meta data or priority data with the words. For example, words with spelling errors or with unusual punctuation (e.g., yOUr P@sswORd) may be given a higher priority in the dictionary because of an increase in likelihood that the words is a password for an encrypted file. As another example, the dictionary may store identifying information regarding the communication (e.g., the sender, recipient, subject, routing information, etc.). This may help narrow the size or further prioritize the words of the dictionary when attempting to decrypt a file. For example, words received in a communication from the same sender as the sender of an encrypted file may be given a higher priority than words from communications from other senders. Depending on the embodiment, the dynamic dictionary may be maintained for an organization (or other grouping of users, such as a household of users), for individual users, for each sender/receiver pair, or any other manner that may be desired.

In various embodiments, disposition block 160 may respond to the results of detection block 150 regardless of whether it sends the file to analysis console 170. For example, disposition block 160 may determine that the decrypted file should be quarantined and may send the file to server block 180 to quarantine the file. In some embodiments, disposition block 160 may also determine that the decrypted file is not malicious or otherwise unwanted and may perform suitable corresponding actions with nodes coupled to external network 110. For example, disposition block 160 may cause the delivery of a message to which the analyzed file was attached in response to the determination by disposition block 160 that the decrypted file does not contain malicious code.

Some or all of system 100, in various embodiments, may be utilized to decrypt and analyze encrypted files. In some embodiments, accessing a file may comprise accessing one or more URLs. For example, aspects of system 100 may be used to decrypt a file found at a URL. Certain embodiments may be used in message environment, such as, but are not limited to, an e-mail environment, an instant messaging environment, a peer-to-peer messaging environment, a chat environment, or other messaging environments. Aspects of system 100, in various embodiments, may also be used in contexts where files are uploaded. For example, some or all of system 100 may be utilized in File Transfer Protocol (FTP) sessions, Wiki sessions, online message boards (such as forums), or other interactive environments. Aspects of system 100 may also be used in a Web browsing context. In such a context, some or all of system 100 may analyze requested Web pages and determine if they contain any malicious files, including encrypted malicious files. System 100 may be used to detect malicious files in these and other contexts utilizing suitable configurations of ingest block 130. For example, if the context is an e-mail context, then ingest block 130 may be configured as a Mail Transfer Agent (MTA) that is able to handle e-mail messages. Configured in this manner, ingest block 130 may analyze a message, an attachment to the message, or both the message and any attachment(s) to the message. When some or all of system 100 operates in a context where files are uploaded, such as in an FTP session, ingest block 130 may be configured to access the file associated with the FTP session and perform analysis on the file. When aspects of system 100 are used in a Web browsing context, ingest block 130 may be configured to retrieve an address associated with an Internet site or files associated with the Internet site and analyze such items.

In particular embodiments, ingest block 130 may be configured to create and update the dynamic dictionary used to decrypt encrypted files. The dynamic dictionary may be created and maintained in a variety of ways. For example, in the email context, ingest block 130 may add words from a message of the email to the dictionary. For purpose of the dynamic dictionary, a word may comprise a string of one or more characters including ASCII characters, Extended ASCII characters, ISO Latin-1 characters (e.g., ISO-8859-1), Windows-1252 characters, HTML characters, or any other character. In certain embodiments the words of the dictionary may be prioritized based on their likelihood to be a password. For example, the following types of words (or string of characters) may have a greater likelihood of being a password than words found in a traditional dictionary (e.g., an English dictionary): words that contain a mix of two or more character types (e.g., letters, numbers, symbols, punctuation, etc.), are misspelled, have improper capitalization (e.g, paSSwORd), are set-off from the rest of the message (e.g., by single or double quotes), or anything else that may indicate that a string of characters is a password. The dictionary may also be prioritized based on the context of the message. For example, the following context associated with the words in a dictionary may increase the priority of the words over other words in the dictionary: words from the message that contains the encrypted file; words in a communication that contains the word "password"; words from other messages from the same sender, words from other messages to the same recipient, words from a message with the same subject line, or any other indicators, or combination of two or more indicators, which may increase the likelihood that the word is a password for the encrypted file. In some situations, the dictionary may be further prioritized and/or maintained based on timing. For example, more recent words may have a higher priority that older words, and words that have were last received more than a predetermined amount of time may be purged from the dictionary.

In some embodiments, some or all of system 100 may be provided as a service to various agents. For example, an agent analyzing traffic passing through a particular boundary of a network may transmit certain traffic (such as one or more files) to aspects of system 100 for analysis and these or other aspects of system 100 may report to the agent the results of the analysis. As another example, an agent residing on a workstation or laptop computer used by end users may similarly transmit one or more files to some or all of system 100 for analysis and receive the results of the analysis. A particular example of such an agent is a client-located module capable of analyzing the downloaded contents of web-based email (e.g., GMAIL by GOOGLE; HOTMAIL by WINDOWS, or any other suitable web-based email program). As another example, a collaborative environment such as one associated with a cross-domain document management system (e.g., RAYTHEON's CHAIN environment) may utilize this service to decrypt encrypted files and check them for malicious code. In some embodiments, aspects of system 100 may be offered as a service using Web service technology, such as Javascript-based Application Programming Interfaces (APIs), Simple Object Access Protocol (SOAP) Remote Procedure Calls (RPCs), and/or other suitable network based APIs.

System 100, in various embodiments, may be configured to operate in one or more of an active mode, a passive mode, and a hybrid mode. Each of these example modes is described below in greater detail.

When operating in an active mode, system 100 may delay one or more operations while the decryption process is proceeding, depending on the context in which system 100 is operating. For example, as discussed above, system 100 may operate in a messaging context such as analyzing e-mail messages. If in the active mode, system 100 may prevent the delivery of an e-mail until an encrypted attachment to the e-mail has been decrypted and analyzed for malicious code using blocks 140-180. In some instances, once the decrypted attachment has been analyzed and found to be free of malicious code, either the original encrypted attachment may be sent on, or the decrypted attachment may be re-encrypted and then sent on. As another example, when system 100 is operating in an active mode in a context where encrypted files are being uploaded, system 100 may stop a file from being uploaded until the encrypted file has been decrypted analyzed for malicious code. Hence, in some embodiments, if an encrypted file was being uploaded to a database, the file would not be entered into the database and made available to other users or processes until the file has been decrypted and analyzed by the system 100 for malicious code. In some instances, once the decrypted file has been analyzed and found to be free of malicious code, either the original encrypted file may be sent on, or the decrypted file may be re-encrypted and then sent on. If system 100 operates in a Web browsing context and is operating in the active mode, an Internet site may not be transmitted to a Web browser requesting the site until any encrypted files on the site have been decrypted and fully analyzed for malicious code by system 100. In some embodiments, ingest block 130 may be used to prevent the completion of operations until the encrypted file has been decrypted and analyzed for malicious code.

System 100, in various embodiments, may operate in a passive mode. While in the passive mode, system 100 may not prevent the operation of processes while an encrypted file is being decrypted and analyzed for malicious code. For example, when system 100 is handling e-mail attachments and operating in the passive mode, the e-mails may continue to be processed and delivered even though the decryption and analysis has not been completed. As another example, when system 100 operates in the passive mode and is operating on files in a file uploading context, an encrypted file may be uploaded, stored, and made available to other users or processes even though the system 100 has not completed decrypting and analyzing the file for malicious code.

System 100, in various embodiments, may operate in a hybrid mode, which may comprise an ability to incorporate aspects of both the passive and active modes. In one example hybrid mode, system 100 may operate in a hybrid mode for detection purposes. For example, when in the hybrid mode, system 100 may allow emails to be processed and delivered during the detection process; however, when an email is determined to include an encrypted file, system 100 may allow the email to proceed in a passive manner but may prevent its contents from being delivered in an active manner. In some instances, the email may be edited by system 100 with a note to the recipient indicating that an attachment to the email is being analyzed and will be sent to the recipient once it has been found to be free of malicious code.

In some embodiments, when system 100 has to delay a communication from reaching the intended recipient, system 100 may inform the intended recipient of the delay (e.g., via email). In some scenarios, system 100 may provide the intended recipient with a hyperlink to a webpage that asks the intended recipient to provide, if known, the password to decrypt the file. System 100 may then try the password entered by the intended recipient.

Figure 2:
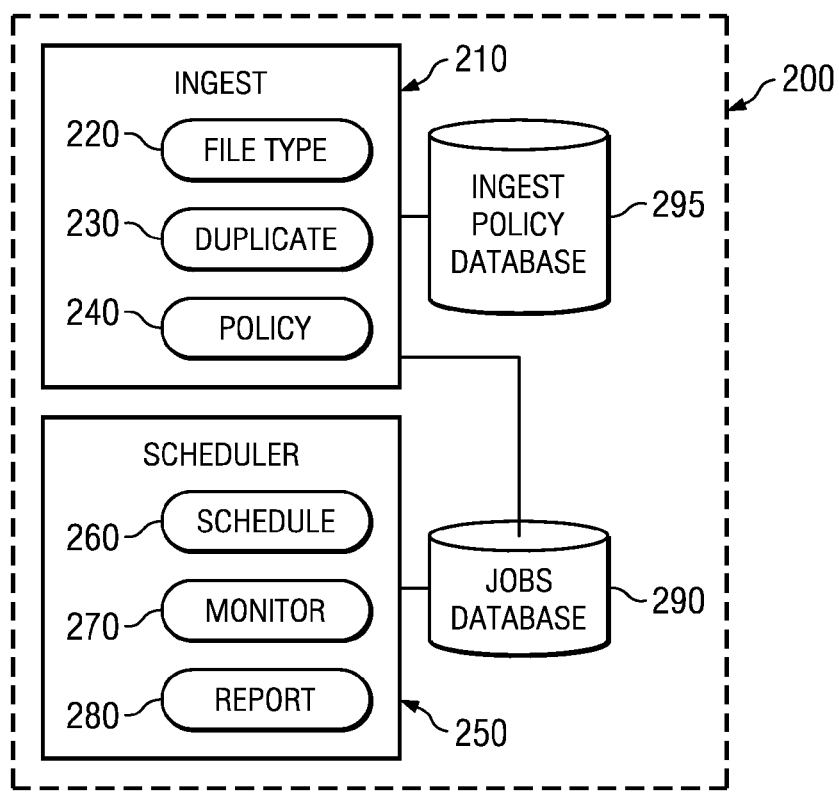
FIG. 2 illustrates one embodiment of a control module.

FIG. 2 illustrates one embodiment of control module 200. Control module 200 includes ingest module 210 and scheduler module 250. Ingest module 210 includes file type module 220, duplicate module 230, and policy module 240. Scheduler module 250 includes schedule module 260, and monitor module 270. Ingest module 210 is coupled to jobs database 290 and ingest policy database 295. Scheduler module 250 is also coupled to jobs database 290. Using ingest module 210 and scheduler module 250, control module 200 may receive a file and schedule the file for one or more decryption and/or malicious code detection schemes as further described below.

File type module 220 may be implemented using encoded software and/or hardware and may reside on the same hardware that ingest module 210 resides upon or on different hardware. File type module 220, in some embodiments, may be configured to determine the type of file that ingest module 210 receives. File type module 220 may, in certain embodiments, also be configured to determine whether a file is encrypted and what type of encryption is used (e.g., PGP, S/MIME, GPG). File type module 220 may determine the type of a file using any suitable methods in combination or separately. For example, file type module 220 may examine an extension associated with the file to determine the type of the file. As another example, file type module 220 may examine portions of the file in order to determine its type. File type module 220 may look at characters in a header of a file to determine its type. Such characters may be referred to as magic numbers or magic bits. In this manner, in some embodiments, file type module 220 may detect the correct type of the file even if the file's extension has been removed or changed. As another example, certain types of files (e.g., MICROSOFT OFFICE files) may be determined based on both magic number(s) and the file extension, possibly examining the magic number(s) prior to examining the file extension.

In various embodiments, duplicate module 230 may be implemented using encoded software and/or hardware and may reside on the same hardware as ingest module 210 or on different hardware. Duplicate module 230 may be configured to determine whether a file has been previously decrypted and analyzed for malicious code. Duplicate module 230 may use one or more techniques to determine if a file has been previously decrypted and analyzed for malicious code. For example, duplicate module 230 may generate one or more hashes of the file (such as a checksum, an MD5 hash, and/or a SHA1 hash). These value(s) may be compared to a database containing hash values of previously analyzed files. If the hash value is in the database duplicate module 230 may determine that the file has been previously analyzed. If the hash value is not present in the database duplicate module 230 may determine that the file has not been previously analyzed. In some embodiments, duplicate module 230 may use the name of the file and/or its extension, as well as variations on those items, to determine if the file has been previously analyzed. Depending on the embodiment and/or scenario, duplicate module 230 may assess whether the encrypted and/or decrypted file has been previously analyzed.

If it is determined that a file has been analyzed previously, malicious code detection schemes may not be applied to the file; instead, the results of the previous analysis of the file may be determined using a database that contains results of a previous analysis of the file. If the results indicate that the file is known to not contain malicious code, then the analysis of the file may end. If it is determined that the file was previously determined to contain malicious code, then it may be determined that the file should be quarantined. If it is determined that the file has been previously received and is currently going through analysis (including review by human analysts), then action may be taken once the outcome of the ongoing analysis is known. In some embodiments, this may allow for more efficient utilization of the resources used to detect malicious code and may reduce the workload of the human analyst.

Policy module 240, in various embodiments, may be implemented using encoded software, hardware or a combination of the two. Policy module 240 may reside on the same hardware as ingest module 210 or it may reside on separate hardware. In some embodiments, policy module 240 may be used to determine whether a file received by ingest module 210 should undergo decryption and analysis for malicious code and/or which decryption and/or analysis schemes should be applied to a file received by ingest module 210. Policy module 240 may be configured to access ingest policy database 295 to make such determinations, in various embodiments. For example, policy module 240 may determine that a file received by ingest module 210 is an encrypted .zip file. Policy module 240 may then access ingest policy database 295 and retrieve one or more policies associated with encrypted .zip files. A retrieved policy may indicate that encrypted .zip files are to be quarantined while the .zip file is decrypted and analyzed for malicious code. As a result, a communication containing the encrypted .zip file may be delayed in being delivered to the intended recipient.

In some embodiments, if policy module 240 determines that a communication is to be delayed in order to attempt to decrypt an encrypted attachment (e.g., if a dictionary or brute force decryption technique is to be employed), policy module 240 may indicate that the intended recipient or the sender of the communication should be prompted for the password. This may greatly reduce the amount of delay the communication may experience while the encrypted attachment is being decrypted. In certain embodiments, if policy module 240 determines that a communication is to be delayed (e.g., it is at the end of a queue of multiple files to be decrypted), policy module 240 may indicate that files in the queue should be decrypted using multiple technique in parallel. For example, a brute force technique (e.g., attempting every character combination) and several different dynamic and static dictionaries may all be applied in parallel to attempt to decrypt the files in the queue quicker.

As another example, policy module 240 may determine that the words of a received communication should be added to a dynamic dictionary used to decrypt encrypted files. Policy module 240 may also specify one or more characteristics that are to be associated with the words. The characteristics may be used to prioritize the words in the dynamic dictionary.

In some embodiments, policy module 240 may also determine that the encrypted file should be accessed by different versions of software. Versions of software may include different versions of an application used to access the file or may include using different versions of an operating system used to access the file. Depending on the embodiment and/or scenario, the different software versions may include different software versions for decrypting the file and/or different software versions for opening and analyzing the decrypted file. In some embodiments, determining to access the file using a variety of versions of software may provide for a more robust detection scheme.

Schedule module 260, in various embodiments, may be implemented using encoded software, hardware or a combination of the two. Schedule module 260 may reside on the same hardware as scheduler module 250 or it may reside on separate hardware. Schedule module 260, in some embodiments, may determine the order in which jobs in jobs database 290 are performed. Schedule module 260 may maintain a list of detection nodes that can receive the jobs and may assign the jobs using any suitable method. For example, schedule module 260 may use a first-in-first-out (FIFO) algorithm to assign jobs to detection nodes. Jobs may also be prioritized. For example, schedule module may use a FIFO approach to schedule jobs initially, but it may be determined to prioritize one job over another in response to results provided by the detection nodes. Schedule policies may be used by schedule module 260 to determine how to schedule jobs and how to prioritize jobs. Priorities for jobs, in some embodiments, may also be determined based on the context associated with the file. For example, if the file undergoing analysis was part of an e-mail attachment, it may be prioritized higher than other files.

In some embodiments, when adding a new decryption or analysis scheme, policies used by schedule module 260 may need to be modified. The interface may require information to be entered regarding how the analysis scheme should be applied. Such information may be entered using a tabbed interface, a wizard-style interface, or other interfaces for entering information. The information required to be entered may include how jobs should be prioritized based on responses from detection nodes, the context associated with the file, what detection nodes are involved in implementing the decryption and analysis for the analysis scheme, and/or other items associated with applying the analysis scheme.

Monitor module 270, in various embodiments, may be implemented using any suitable combination of encoded software and hardware. Monitor module 270 may reside on the same hardware as scheduler module 250 or it may reside on separate hardware. Monitor module 270 may be able to monitor the capacity of detection nodes that apply various decryption and analysis schemes to an encrypted file. In some embodiments, monitor module 270 may query the detection nodes to determine their status. Example status responses may include "offline" and/or "busy." In some embodiments, monitor module 270 may determine if a detection node has taken too long to analyze a file. Monitor module 270 may be able to reboot or restore aspects of detection nodes. In various embodiments, monitor module 270 may be able to reconfigure a detection node so that the detection node may perform a different type of analysis. This reconfiguration may be performed in response to the types of files that are scheduled to be analyzed. In some embodiments, this reconfiguration capability may provide an advantage in that detection nodes may be utilized efficiently and files may be analyzed faster.

Monitor module 270 may also be able to determine when the capacity of the detection nodes reaches a critical threshold. Schedule module 260 and/or monitor module 270 may ensure that detection nodes do not pass critical thresholds. Monitor module 270 may also be able to determine when the load on the detection nodes decreases below a critical threshold. Monitor module 270 may also be able to establish various thresholds regarding the capacity of detection nodes and may be able to determine when the load of the various detection nodes has gone below any of the thresholds. For example, the ability to monitor thresholds and take appropriate action in response to the monitoring may be particularly useful in determining when to switch between one or more modes of operation, such as the active, passive, and hybrid modes. As a particular example, if a particular detection node is determined to be too busy (e.g., exceeds a capacity threshold) and that particular detection node is in active mode, it may be appropriate to switch the particular detection node to passive mode to avoid significant processing delays.

Databases 290 and 295 may be implemented using a variety of database structures. The databases may be row-oriented or column-oriented. They may include relational databases and/or object-oriented databases. Databases 290 and 295 may be indexed and accessed in a variety of manners, including by utilizing an operating system or through one or more networks. In some embodiments, databases 290 and 295 may be implemented in one database such that separate tables within the database may be used to store the information contained in databases 290 and 295.

In some embodiments, jobs database 290 stores jobs related to decrypting a file and determining if it contains malicious code. A job stored in the database may include information such as an identifier associated with the file, information regarding what type of decryption should be used and/or what test(s) should be applied to determine if the file contain malicious code, and the priority associated with the job. Jobs database 290 may be configured so that it can be accessed by ingest module 210 and scheduler module 250. Ingest module 210 may insert jobs into the job database and scheduler module 250 may read the jobs database to determine which jobs need to be assigned to detection nodes.

In some embodiments, ingest policy database 295 may contain a set of policies that determine what decryption schemes should be applied to various types of files, and once decrypted, what type of analysis schemes should be applied to determine if the decrypted file contains malicious code. The policies may be applied by type of file or other suitable criteria. Some of the policies of policy database 295 may include classification schemes (such as recognizing generic suspect patterns), signature-based detection schemes (such as those looking for specific byte patterns), meta-data detection schemes, as well as behavior-based detection schemes. The behavior-based detection scheme specified by the policies may include accessing the file in a virtual or real environment.

In various embodiments, the policies specify the type of access applied to the files (e.g., once decrypted) based on the file type. For example, if the file type is an executable file type accessing the file may include executing the file within a virtual environment. As another example, if the file type is a MICROSOFT WORD document the policy may specify that accessing the file within the virtual environment includes opening the file using MICROSOFT WORD or using various versions of MICROSOFT WORD or using various versions of other word processors that are also able to access a MICROSOFT WORD document. If handling URLs, for example, accessing the file may include using one or more different browsers, such as MOZILLA FIREFOX and OPERA, to access a web page located at the address provided by the URL. A variety of suitable applications may be used to access the files. Policies may also specify different types of virtual environments that should be used when accessing the file. For example, policies may specify that the file should be accessed within one or more versions of the WINDOWS operating system, within a version of an operating system using the LINUX kernel, within a version of the MAC OS operating system, within versions of operating systems using the BSD kernel, within a version of an embedded operating system, within a version of a non-conventional operating system (e.g., a mobile operating systems such as those used in smart phones), and/or within other versions of any other suitable operating systems or computing environments. Other suitable forms of decryption and malicious code detection schemes can be stored and applied in the policies.

In some embodiments, when adding a new decryption or analysis scheme, an interface may be provided to modify one or more policies of ingest policy database 295. The interface may require information to be entered regarding how the new scheme should be applied. Such information may be entered using a tabbed interface, a wizard-style interface, or other suitable interfaces for entering information. The information entered may include: the file types that should be associated with the new scheme, identifiers associated with the detection nodes that implement the new scheme, jobs to be carried out when implementing the new scheme, and/or other items associated with applying the new scheme. In some embodiments, a policy may be developed that handles files for which the file type is unknown or files for which the file type is not associated with any specific policy. Suitable decryption and malicious code detection schemes may be applied to such files, such as one or more of classification schemes, signature-based schemes, and behavior-based schemes.

In operation, control system 200 may be able to receive an encrypted file or a communicant containing an encrypted file and use ingest module 210 to determine what decryption scheme should be applied to decrypt the file, and what malicious code analysis scheme should be applied to the decrypted file. File type module 220 may determine the file type and duplicate module 230 may determine whether or not the file has been previously analyzed. If the file has not been previously analyzed, policy module 240 may access a policy in ingest policy database 295. Policy module 240 may use the accessed policy to determine a set of schemes that should be applied to the file based on the encryption type and/or file type. Policy module 240 may then enter jobs into jobs database 290 in order to implement the determined detection schemes. Scheduler module 250 may then schedule and monitor the application of the determined schemes to the file. Schedule module 260 may assign the jobs in jobs database 290 to one or more detection nodes.

Monitor module 270 may monitor the load applied to the detection nodes and determine if the load has surpassed a critical value or threshold. In response to passing the threshold, monitor module 270 may report this occurrence. As a result, the system may switch from operating in an active mode to operating in a passive mode. This may be advantageous, in various embodiments, because the time it takes to complete an analysis of a file may depend on the load present on the detection nodes. For example, if the system is operating in an active mode and files are entering the system at a rate above a particular threshold, messages or other services may be disrupted causing a lower quality of service. By switching into a passive mode, the system may allow the analysis of the file to proceed without lowering the quality of service of services associated with the file being analyzed. For example, certain decryption and/or malicious code detection schemes may proceed in real-time (e.g., signature-based or classification-based analysis) while others (e.g., behavior-based analysis) may be delayed. If the detection schemes proceeding in real-time did not cause an alert, then other analyses may be delayed. If the detection schemes proceeding in real-time did cause an alert, then other jobs associated with the file may be given greater priority in the jobs queue. If the load on the detection nodes falls below a critical threshold, monitor module 270 may report this occurrence. In response, the system may enter into an active mode of operation which may allow, in some embodiments, for greater security since operations associated with the context of the file are delayed while the analysis of the file is proceeding. As another example, in a hybrid mode, files determined to contain malicious code may delayed or removed from the mail stream while files determined not to contain malicious code may not be delayed or removed from the mail stream.

Figure 3:
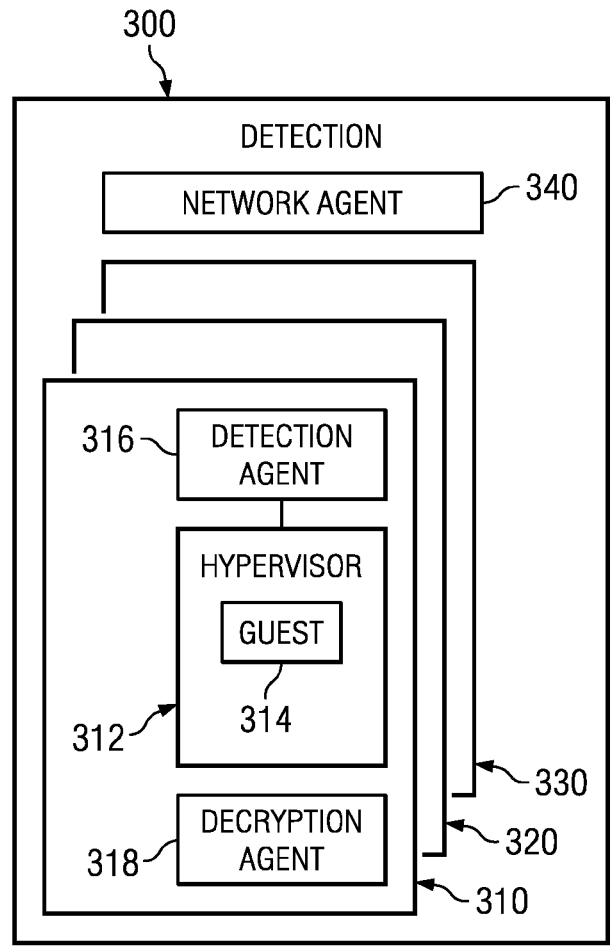
FIG. 3 illustrates one embodiment of a detection subsystem.

FIG. 3 illustrates one embodiment of detection subsystem 300. Detection subsystem 300 includes detection nodes 310, 320 and 330 and network agent 340. Detection node 310 includes hypervisor 312, one or more guest operating systems (GOS) 314, detection agent 316, and decryption agent 318. Subsystem 300 may be used to decrypt a file and assess whether it contains malicious code.

In some embodiments, detection nodes 310-330 may conform to an interface standard for decrypting and/or analyzing a file for malicious code. Such an interface may include standards for one or more of the following: specifying the file (including, possibly, a URL) that is to be analyzed, configuration parameters for applying the decryption/analysis scheme, time limit for completing the analysis, format of results, specifying the reason for indicating that an analyzed item is suspect, providing log files, and other suitable items involved with decrypting and/or analyzing a file for malicious code. In some embodiments, having such an interface may be advantageous because it may allow policies to call for the application of decryption and malicious code analysis schemes without having to give precise parameters based on the configuration of the detection node. In this manner, in various embodiments, new detection schemes may be added to the system without needing to recode various parts of the system since the detection node applying the new detection scheme would conform to the interface standard. For example, to add a new detection scheme, the detection node applying the new detection scheme may be configured to conform to the interface standard by being configured to receive files for analysis in the same or similar manner as other configuration nodes applying other detection schemes. In addition, for example, the configuration node applying the new detection scheme may be configured to report the results of applying the new detection scheme in the same or similar manner as other configuration nodes applying other detection schemes. This, in some embodiments, may be advantageous in that it allows for the system to adapt to new detection schemes.

Detection nodes 310-330 may be implemented on a variety of types of hardware. They may be configured in a blade architecture or on physical hosts. Detection nodes 310-330 may also be configured utilizing clusters or other suitable distributed computing architectures. Detection nodes 310-330 may utilize virtualization or may themselves be virtual machines. Detection nodes 310-330 may be used to apply a variety of decryption and malicious code detection schemes to a file (which, in some embodiments, may include one or more URLs). In some embodiments, detection nodes 310-330 may be specialized such that each detection node may be configured to apply a type of detection and/or malicious code detection scheme. For example, detection node 310 may be configured to apply password decryption schemes while detection node 320 may be configured to apply malicious code analysis and/or detection schemes. In yet another example, detection node 330 may be configured to add, remove, update, and/or modify the words of a dictionary when new communications are received (regardless of whether the communication contains an encrypted file). As another example, nodes 310-330 may also apply classification-based detection schemes. As discussed above, detection nodes 310-330 may be configured to apply other forms of detection schemes that conform to an interface to facilitate the incorporation of new or different detection schemes. In various embodiments, subsystem 300 may include a variety of detection nodes in addition to detection nodes 310-330.

Detection agent 316 may be implemented using encoded software. In some embodiments, detection agent 316 may be installed on detection node 310. In various embodiments detection agent 316 may reside on hardware separate from detection node 310 but in communication with detection node 310 and in particular hypervisor 312. Detection agent 316 may be configured to receive jobs that describe decryption and/or malicious code detection schemes that should be applied to a file. Detection agent 316 may also be configured to receive the file and send it to hypervisor 312 and cause hypervisor 312 to implement the decryption and/or malicious code detection scheme from the job on the file. Detection agent 316 may also be configured to monitor the execution of the decryption and/or malicious code detection scheme and report when it is completed. Detection agent 316 may report the results of the application of the decryption and/or malicious code detection scheme to the file.

Decryption agent 318 may be implemented using encoded software. In some embodiments, decryption agent 318 may be installed on detection node 310. In various embodiments decryption agent 318 may reside on hardware separate from detection node 310 but in communication with detection node 310, and in particular hypervisor 312. Decryption agent 318 may be configured to receive jobs that describe decryption schemes that should be applied to an encrypted file. Decryption agent 318 may also be configured to receive an encrypted file and attempt to determine the password. The decryption agent may determine it was unable to decrypt the file, in which case the decryption agent may wait to attempt to decrypt the file at a later time or it may flag the file to be decrypted by another component or device. If the decryption agent is able to determine the password to decrypt the file it may either return the password and let another component actually decrypt the file, or it may itself decrypt the file and return the decrypted file for subsequent processing (e.g., malicious code detection or content scanning) In some scenarios, such as with encrypted archives, decryption agent 318 may have to first decompress the files and then it can attempt to decrypt the decompressed files. In certain scenarios, decryption agent 318 may be configured to receive an encrypted file and send it to hypervisor 312 for hypervisor 312 to implement the decryption scheme on the file. Decryption agent 318 may also be configured to monitor the execution of the decryption scheme and report when it is completed. Decryption agent 318 may report the results of the application of the decryption scheme to the file.

In some embodiments, detection agent 316 and decryption agent 318 may be invoked as part of the same job. In some embodiments, detection agent 316 and decryption agent 318 may be invoked as part of separate jobs. For example, decryption agent 318 may determine the password used to decrypt the file and send the password to the scheduler, the scheduler may then have the filed decrypted and sent to detection agent 316 for analysis. In various embodiments, agents such as detection agent 316 and decryption agent 318 may be present in other detection nodes such as nodes 320-330 and cause those nodes to implement a variety of decryption and/or malicious code detection schemes. For example, a detection agent on detection node 320 may cause detection node 320 to implement a signature-based malicious code detection scheme. As another example, a decryption agent on detection node 330 may cause detection node 320 to implement a dynamic dictionary based decryption scheme on an encrypted file. In certain embodiments or scenarios, several detection nodes may work in parallel to decrypt a file. The different nodes may, for example, attempt to decrypt the file using different decryption techniques (e.g., a dynamic dictionary based technique, a standard dictionary based technique, any of a variety of brute force decryption techniques, etc.). The different nodes may, for example, attempt to decrypt the file using different approaches based on the same technique (e.g., starting at different points in a dynamic dictionary, sorting the dynamic dictionary based on different criteria, etc.).

Hypervisor 312 may be implemented using various types of hypervisors such as those provided in virtualization solutions from VMWARE, PARALLELS, and XEN. In some embodiments, the KI-2 hypervisor from RAYTHEON may be employed. Hypervisor 312 may be used to apply decryption and/or malicious code detection schemes in a virtual environment. Hypervisor 312 may host GOS 314. In various embodiments, multiple guest operating systems may be hosted by hypervisor 312.

Hypervisor 312 may cause the application of detection schemes within GOS 314. In some embodiments, hypervisor 312 may be able to apply decryption and/or malicious code detection schemes to a file at a configurable observation time (including, in some embodiments, in faster-than-real-time) by causing the execution to ignore wait states associated with GOS 314. For example, in some embodiments, a password for an encrypted file may be determined and applied to the encrypted file. The decrypted file may then be sent to a malicious code detection scheme applied by hypervisor 312.

Hypervisor 312 may, in various embodiments, be able to provide near-instant reversions of GOS 314 during jobs or between jobs. This may be accomplished, for example, by maintaining a state of GOS 314 in memory and tracking changes made to GOS 314 during the execution of the decryption and/or malicious code detection schemes. The tracked changes may also be stored in memory. When the decryption and/or malicious code detection scheme is completed, GOS 314 may be reverted by undoing the changes to GOS 314 during execution of the decryption and/or malicious code detection scheme using changes stored in memory.

In some embodiments, by applying near-instant reversions and/or applying decryption and/or malicious code detection schemes at a configurable observation time, processing of files may be accomplished faster allowing the system to have a higher throughput of analyzed files. These techniques may be applied in both an active mode and a passive mode.

Hypervisor 312 may also be able to provide information regarding the execution of the decryption and/or malicious code detection schemes without running a process within GOS 314 in various embodiments. Doing so, in some embodiments, may thwart attempts by malicious code to detect if a malicious code detection scheme is being applied to the malicious code. For example, a decrypted file may contain code that is configured to examine processes running in an operating system. Based on that examination, the malicious code may recognize certain processes as being associated with the application of malicious code detection schemes. As a result, in an attempt to remain undetected during the application of the malicious code detection scheme, the malicious code may change its behavior so that it does not act maliciously or otherwise abnormally. However, the malicious code may change its behavior once it is in a normal environment where malicious code detection schemes are not being applied. In some situations, monitoring of GOS 314 may occur at the machine layer so as to avoid running processes. Hence, in various embodiments, it may be advantageous for hypervisor 312 to provide monitoring of GOS 314 without running a process within GOS 314. Other suitable techniques may be applied within hypervisor 312 to hide the fact that a hypervisor is being used from an application and/or to hide the existence of an application running inside an operating system.

In various embodiments, GOS 314 may be any of a variety of virtualized operating systems. Examples of such operating systems include various versions of MICROSOFT WINDOWS, APPLE MAC OS, operating systems using the LINUX kernel, operating systems using the BSD kernel, embedded operating systems, mobile operating systems (including those used in mobile telephones or devices), or other computing environments. GOS 314 may include a variety of applications used to access different file types. Such applications may include e-mail clients, word processing applications, image viewing applications, audio applications, video applications, Internet browsing applications, e-mail applications, or other applications.

In some embodiments, a report may be sent based on the monitored behavior and results. An agent associated with the hypervisor may gather the information and send the report. The report may include information such as the name of the file, the type of the file, the versions of applications used to access the file, the versions of the guest operating system used to access the file, the version of the hypervisor used to access the file, the changes to the guest operating system while the file was being accessed, the resources of the virtualized hardware being used while the file was being accessed, and/or other items associated with accessing the file. This information may be used by human analysts to determine whether or not the decrypted file contains malicious code or to gain more insight to the file.

Network agent 340 may, in various embodiments, be implemented using encoded software, hardware, or a combination of both. Network agent 340 may be configured to provide virtualized networking services to detection nodes 310-330. In some embodiments, these services include simulating a network environment and network nodes in order to facilitate the application of various decryption and/or malicious code detection schemes. For example, detection node 310 may implement a behavior-based malicious code detection scheme that includes accessing the file in GOS 314. Part of the malicious code detection scheme may include observing how accessing the file impacts a network. Network agent 340 may provide virtual networking services in order to provide the file opportunity to interact with a network. In some embodiments, the network may be simulated.

Figure 4:
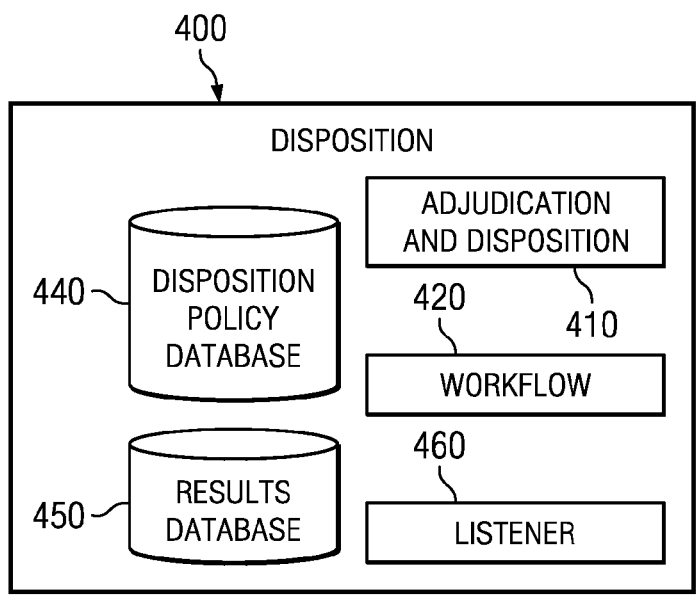
FIG. 4 illustrates one embodiment of a disposition subsystem.

FIG. 4 illustrates one embodiment of disposition subsystem 400. Disposition subsystem 400 includes adjudication and disposition module 410, workflow module 420, policy database 440, and results database 450. Each of modules 410-420 may communicate with one another as well as communicate with results database 450 and policy database 440 in various embodiments. Further details regarding the components of disposition subsystem 400 are given below and in the description of FIG. 5.

Modules 410-420 and 460 may be implemented using encoded software, hardware, or a combination of the two. Each of modules 410-420 and 460 may be implemented on the same hardware or on different hardware. For example, modules 410-420 and 460 may each be on separate pieces of hardware.

Databases 440 and 450 may each be implemented in hardware separate from each other or on the same hardware. Databases 440 and 450 may be implemented on the same or different hardware as modules 410-420. The databases may be row-oriented or column-oriented. They may include relational databases and/or object-oriented databases. Databases 440 and 450 may be indexed and accessed in a variety of manners, including by utilizing an operating system or through one or more networks. In some embodiments, databases 440 and 450 may be implemented in one database such that separate tables within the database may be used to store the information contained in databases 440 and 450.

Adjudication and disposition module 410, in some embodiments, may analyze the outcome of the decryption and malicious code analysis schemes applied to a file to determine if the file contains malicious code. Adjudication and disposition module 410 may access policy database 440 to select one or more adjudication policies in order to determine how a file should be decrypted and whether the decrypted file contains malicious code. Adjudication policies from policy database 440 may include various ways to determine how to characterize a file. In various embodiments, possible characterizations of a file may include: (1) the file is known to contain malicious code; (2) the file is known not to contain malicious code; (3) the file is suspected of containing malicious code; and (4) the file is not suspected to contain malicious code. The adjudication policies may contain rules which indicate which one of the characterizations should be applied to a decrypted file based on the results of one or more malicious code detection schemes applied to the file. For example, an adjudication policy may include a weighted score that is applied to the outcomes of each of a number of malicious code detection schemes applied to the file. Based on the sum of the weighted scores, the adjudication policy may indicate the proper characterization of the file. Adjudication and disposition module 410 may determine the appropriate adjudication policy to use for the file in question, retrieve the outcomes of the detection schemes performed on the file, and use the adjudication policy to apply weighted scores to each of those outcomes. Adjudication and disposition module 410 may also, in some embodiments, use the sum of the applied weighted scores to characterize the file according to the adjudication policy. Although weighted scoring is described, the present invention contemplates using any suitable selection mechanism according to particular needs.

One or more adjudication policies may be chosen to evaluate the outcome of the detection schemes applied to the file based on a variety of factors. For example, the file's type may be used to determine what policy to select. The context from where the file came may also be used to select an adjudication policy. Examples of context include a messaging context, a file uploading context, and a browsing context as discussed above.

Adjudication and disposition module 410 may provide entries for results database 450 after determining the characterization to use for the file. For example, if the weighted score determined by adjudication and disposition module 410 leads adjudication and disposition module 410 to characterize the file as malicious code according to a selected policy, adjudication and disposition module 410 may create an entry in results database 450 which include any or all of the following items: the name of the file, the type of the file, a hash value associated with the file, the individual scores applied to the file, the sum of the scores applied to the file, the adjudication policy applied to the file, and the characterization applied to the file.

In some embodiments, workflow module 420 may determine a workflow for use by a human analyst to review the file. A file may need to be reviewed by a human analyst based on the characterization of the file determined by adjudication and disposition module 410. For example, if adjudication and disposition module 410 characterizes the file as suspected malicious code then a human analyst may review the file to determine if it is malicious code. As another example, if the file is determined to be malicious code rather than merely to be suspected malicious code, a human analyst may review the file in order to learn more about the malicious code in the file and/or to start an incident response review (e.g., to clean up the file). In such and other scenarios, workflow module 420 may determine tasks associated with reviewing the file. In some embodiments, workflow module 420 may generate a set of tasks to be performed by a human analyst reviewing the file based on a variety of factors. Such factors could include the type of file being reviewed and the characterization of the file by adjudication and disposition module 410. Other factors may include whether the system is operating in a passive or an active mode. For example, if operating in an active mode, a determination that the file is suspected malicious code may invoke an advanced malicious code analysis workflow to be followed by a human analyst. As another example, if the file is determined to contain known malicious code, then workflows associated with cleaning up the environment(s) the file has been in as well as other incident response workflows (e.g., notifying a user or an administrator) may be determined. Other suitable workflows may be generated based on these or other suitable factors.

Workflow module 420 may, in various embodiments, automatically perform certain tasks associated with reviewing the file by a human analyst to facilitate the review of the file by the human analyst. For example, it may be determined that in order for a file to be properly reviewed by a human analyst, all strings in the file should be extracted. Workflow module 420 may automate this procedure such that it is already performed for the human analyst when they receive the task. Workflow module 420 may also provide a priority associated with the review of the file. For example, if the file has already been determined to contain malicious code, a lower priority may be assigned to the review of the file compared to a file that is suspected of containing malicious code. Also, based on the characterization and/or the mode the system is operating in, entirely different workflows may be generated for the file or the file may be placed in different queues. In various embodiments, workflow module 420 may be configured to interact with an analysis console (e.g., analysis console 170) to facilitate the creation and operation of the workflows. Policies stored in policy database 440 may also contain information on workflows to be applied to files based on their characterization. Workflow module 420 may, in some embodiments, access policy database 440 in order to determine the workflow that should be applied to the file. In various embodiments, workflow module 420 may receive one or more disposition policies that may be used to determine the workflow from adjudication and disposition module 410, as further discussed below.

In some embodiments, adjudication and disposition module 410 may perform operations associated with the context of the file in response to the characterization of the file determined by adjudication and disposition module 410. As discussed above, a file may come from a variety of contexts including a messaging context, a browsing context (this context may include processing URLs), or a file uploading context. The characterization of the file may cause certain operations to be performed related to the context of the file. For example, if the file came from a messaging context (e.g., the file was an attachment to an e-mail), the characterization of the file may cause effects on the e-mail from which the file was extracted. It may be determined whether the e-mail should be delivered based on the characterization of the file. As another example, if the system were analyzing a URL, the context of where the URL was found may affect the operations performed. If the URL was found in the body of an e-mail message, for example, the message may be prevented from being delivered. On the other hand, if the URL was found in the body of an attachment to the e-mail message, the message may be delivered but, optionally, the attachment may be stripped and/or the URL may be removed. As another example, in certain embodiments, regardless of the context in which the URL is found, if the URL is determined to be associated with malicious code, the message may not be delivered. Adjudication and disposition module 410 provides functionality that allows for these types of operations to be performed.

In various embodiments, adjudication and disposition module 410 may take the mode that the detection system is operating in into account when determining actions to perform. For example, if the detection system is operating in a passive mode and the file is characterized as malicious code, adjudication and disposition module 410 may cause an alert to be sent to an administrator that the file has been characterized as malicious code. As another example, if the file was attached to an e-mail message and the malware detection system was operating in an active mode, then characterizing the file as not containing malicious code would cause the adjudication and disposition module 410 to indicate that the e-mail should be delivered. In various embodiments, adjudication and disposition module 410 may refer to one or more disposition policies in policy database 440 to determine one or more actions to be taken as a result of the characterization.

In some embodiments, when adding a new detection and/or decryption scheme, an interface may be provided to modify one or more adjudication or disposition policies of policy database 440. The interface may require information to be entered regarding how the malware detection scheme should be applied. Such information may be entered using a tabbed interface, a wizard-style interface, or other suitable interfaces for entering information. Such information may include: weighted scoring algorithms to apply to responses from detection nodes, workflows that may be generated based on the response of the detection nodes, thresholds or ranges that determine how the file should be characterized based on the response of the detection nodes, actions that should occur based on the characterization of the file, and/or other items associated with a detection scheme. In some embodiments, the interface may allow for new actions to be defined that would respond to characterizations of the file. A modular architecture may be utilized where new actions would be able to be "plugged in" to the system so that disposition policies may be easily modified or added.

Listener module 460, in various embodiments, may be implemented using encoded software, hardware or a combination of the two. Listener module 460 may be able to determine when jobs assigned to detection nodes are complete and report the completed status. In some embodiments, the results of listener module 460 may be used by monitor 270 to determine the load of the detection nodes. In some embodiments, listener module 460 may be contacted by a detection node once it has completed analyzing a file and receive the results of the analysis. Listener module 460 may determine when the job has been completed and report the results of completed jobs. In some embodiments, listener module 460 may store the results of the jobs in results database 450. Listener module 460 may increase the priority of jobs in jobs database 290 based on the reported results of completed jobs. For example, if a file has been scheduled to have five detection schemes applied to the file and one of the detection schemes has reported that there is a high likelihood that the file contains malicious code, listener module 460 may increase the priority of the jobs associated with this file.

Figure 5:
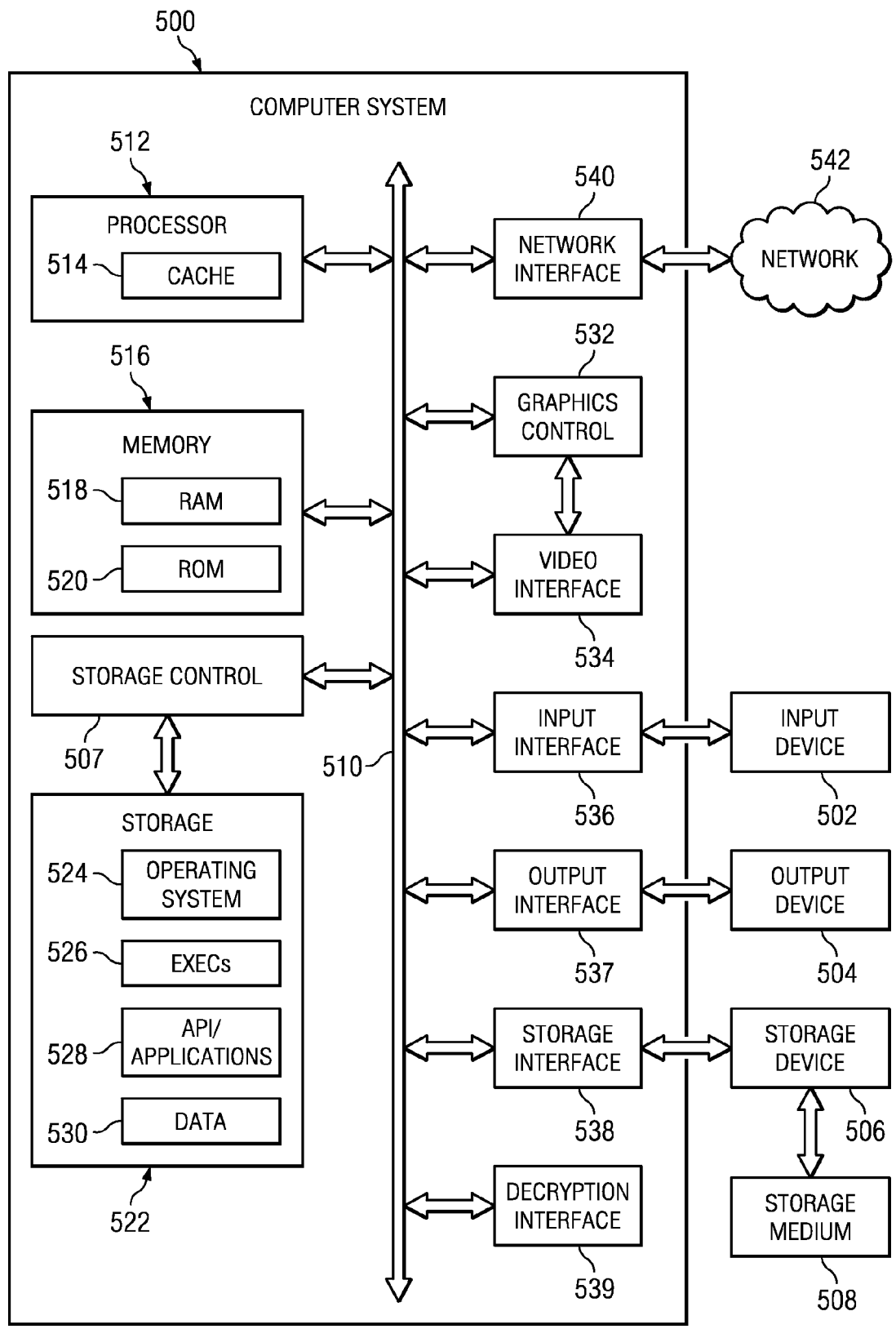
FIG. 5 illustrates an example computer system suitable for implementing one or more portions of particular embodiments.

FIG. 5 illustrates an example computer system 500 suitable for implementing one or more portions of particular embodiments. Although the present disclosure describes and illustrates a particular computer system 500 having particular components in a particular configuration, the present disclosure contemplates any suitable computer system having any suitable components in any suitable configuration. Moreover, computer system 500 may have take any suitable physical form, such as for example one or more integrated circuits (ICs), one or more printed circuit boards (PCBs), one or more handheld or other devices (such as mobile telephones or PDAs), one or more personal computers, one or more super computers, one or more servers, and one or more distributed computing elements. Blocks 130-180 of FIG. 1 as well as the elements discussed in FIGS. 2-4 may be implemented using all of the components, or any appropriate combination of the components, of computer system 500 described below.

Computer system 500 may have one or more input devices 502 (which may include a keypad, keyboard, mouse, stylus, or other input devices), one or more output devices 504 (which may include one or more displays, one or more speakers, one or more printers, or other output devices), one or more storage devices 506, and one or more storage medium 508. An input device 502 may be external or internal to computer system 500. An output device 504 may be external or internal to computer system 500. A storage device 506 may be external or internal to computer system 500. A storage medium 508 may be external or internal to computer system 500.

System bus 510 couples subsystems of computer system 500 to each other. Herein, reference to a bus encompasses one or more digital signal lines serving a common function. The present disclosure contemplates any suitable system bus 510 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 500 includes one or more processors 512 (or central processing units (CPUs)). A processor 512 may contain a cache 514 for temporary local storage of instructions, data, or computer addresses. Processors 512 are coupled to one or more storage devices, including memory 516. Memory 516 may include random access memory (RAM) 518 and read-only memory (ROM) 520. Data and instructions may transfer bidirectionally between processors 512 and RAM 518. Data and instructions may transfer unidirectionally to processors 512 from ROM 520. RAM 518 and ROM 520 may include any suitable computer-readable storage media.

Computer system 500 includes fixed storage 522 coupled bi-directionally to processors 512. Fixed storage 522 may be coupled to processors 512 via storage control unit 507. Fixed storage 522 may provide additional data storage capacity and may include any suitable computer-readable storage media. Fixed storage 522 may store an operating system (OS) 524, one or more executables (EXECs) 526, one or more applications or programs 528, data 530 and the like. Fixed storage 522 is typically a secondary storage medium (such as a hard disk) that is slower than primary storage. In appropriate cases, the information stored by fixed storage 522 may be incorporated as virtual memory into memory 516. In some embodiments, fixed storage 522 may include network resources, such as one or more storage area networks (SAN) or network-attached storage (NAS).

Processors 512 may be coupled to a variety of interfaces, such as, for example, graphics control 532, video interface 534, input interface 536, output interface 537, storage interface 538, and decryption interface 539, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 540 may couple processors 512 to another computer system or to network 542. Network interface 540 may include wired, wireless, or any combination of wired and wireless components. Such components may include wired network cards, wireless network cards, radios, antennas, cables, or any other appropriate components. With network interface 540, processors 512 may receive or send information from or to network 542 in the course of performing steps of particular embodiments. Particular embodiments may execute solely on processors 512. Particular embodiments may execute on processors 512 and on one or more remote processors operating together.

In some embodiments graphics control 532 and/or video interface 534 may be implemented as a graphics card. In certain scenarios, decryption tasks may be handled by a graphics card. The graphics card may work alone or with processor 512 to decrypt a file. In some embodiments, decryption interface 539 may be implemented as a purpose built decryption card. The decryption card may work alone or with processor 512 and/or a graphics card to decrypt a file. For example, in some instances processor 512, the graphics card, and the decryption card may work in parallel to determine a password for an encrypted file, each component applying a different dynamic dictionary or starting from a different point in the same dictionary, or sorting the dictionary in a different order, etc.

In a network environment, where computer system 500 is connected to network 542, computer system 500 may communicate with other devices connected to network 542. Computer system 500 may communicate with network 542 via network interface 540. For example, computer system 500 may receive information (such as a request or a response from another device) from network 542 in the form of one or more incoming packets at network interface 540 and memory 516 may store the incoming packets for subsequent processing. Computer system 500 may send information (such as a request or a response to another device) to network 542 in the form of one or more outgoing packets from network interface 540, which memory 516 may store prior to being sent. Processors 512 may access an incoming or outgoing packet in memory 516 to process it, according to particular needs.

Particular embodiments involve one or more computer-storage products that include one or more tangible, computer-readable storage media that embody software for performing one or more steps of one or more processes described or illustrated herein. In particular embodiments, one or more portions of the media, the encoded software, or both may be designed and manufactured specifically to perform one or more steps of one or more processes described or illustrated herein. In addition or as an alternative, in particular embodiments, one or more portions of the media, the encoded software, or both may be generally available without design or manufacture specific to processes described or illustrated herein. Example computer-readable storage media include, but are not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, and other suitable computer-readable storage media. In particular embodiments, encoded software may be machine code which a compiler may generate or one or more files containing higher-level code which a computer may execute using an interpreter.

As an example and not by way of limitation, memory 516 may include one or more tangible, computer-readable storage media embodying software and computer system 500 may provide particular functionality described or illustrated herein as a result of processors 512 executing the encoded software. Memory 516 may store and processors 512 may execute the encoded software. Memory 516 may read the encoded software from the computer-readable storage media in mass storage device 516 embodying the encoded software or from one or more other sources via network interface 540. When executing the encoded software, processors 512 may perform one or more steps of one or more processes described or illustrated herein, which may include defining one or more data structures for storage in memory 516 and modifying one or more of the data structures as directed by one or more portions the encoded software, according to particular needs.

In some embodiments, the described processing and memory elements (such as processors 512 and memory 516) may be distributed across multiple devices such that the operations performed utilizing these elements may also be distributed across multiple devices. For example, encoded software operated utilizing these elements may be run across multiple computers that contain these processing and memory elements. Other variations aside from the stated example are contemplated involving the use of distributed computing.

In addition or as an alternative, computer system 500 may provide particular functionality described or illustrated herein as a result of logic hardwired or otherwise embodied in a circuit, which may operate in place of or together with encoded software to perform one or more steps of one or more processes described or illustrated herein. The present disclosure encompasses any suitable combination of hardware and encoded software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Figure 6:
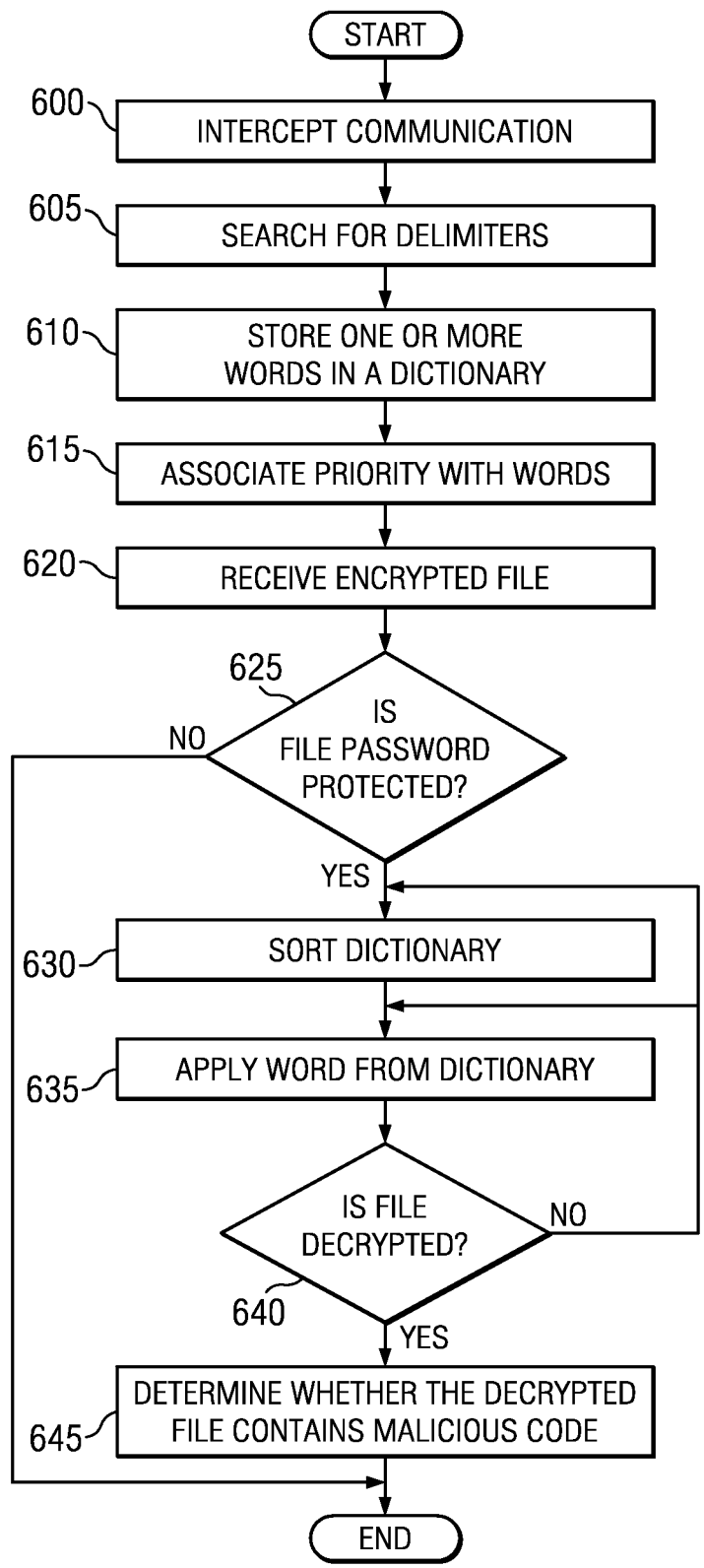
FIG. 6 illustrates a flow chart of a method of one embodiment of processing and decrypting a file.

FIG. 6 depicts a flow chart illustrating one embodiment of processing and decrypting a file. Depending on the embodiment and/or system configuration, the system performing the steps of the depicted flow chart may be implemented in any of a variety of locations. For example, in some embodiments, the system may be implemented as part of a firewall or provided at a network access point. As another example, the system may be implemented as part of a security system being executed on a user's local computer. As another example, the system may be part of a company's security software system. For purposes of this method it may be assumed that the file to be decrypted is received as an email attachment. It may also be assumed, for purposes of this method, that the file is being decrypted so as to be able to determine if the file contains malicious code. Other embodiments and/or scenarios may decrypt a file for any of a number of reasons, such as to determine if the sender is attempting to disseminate sensitive material (e.g., trade secrets, intellectual property, confidential material, classified material, etc.).

The method begins at step 600 with the interception of a communication comprising a message. While in this embodiment the communication includes an attachment (e.g, the email attachment), in other scenarios the intercepted communication may not include an attachment. If the intercepted communication does not have an attachment, the method may still process the communication according to steps 600-615. This may help build the dictionary for subsequent use. Depending on the configuration of the system, the intercepted communication may be an email, a text message, an instant message, or any other communication that may contain a text-based message.

At step 605 the intercepted communication is searched for delimiters. Delimiters may be characters within the communication that may indicate a start and a stop for a string of characters forming a word. Thus, pairs of delimiters may divide the message into words that may be identified for storage in the dictionary. A word in this context is not limited to an entry in a standard dictionary, such as an English dictionary. Rather, a word may be any string of characters which may be used as a password. Thus, it may be the case that a single word may comprise one or more spaces. For example, a phrase comprising two English words set-off by quotation marks, parenthesis, brackets, angle brackets, etc. may be considered a word. For example, in a communication comprising the following string of characters, <Here's the Password>, the "<" and ">" characters may be considered delimiters and the phrase "Here's the Password" may be considered a word. In some embodiments, the system may take into account the number or type of characters between potential delimiters before marking them as a delimiter. For example, a set of quotation marks surrounding a long string of characters is more likely to be an indicator of a quote than of a password. In some embodiments, a "space" character may be considered to be a default delimiter absent any unique characters that may be considered to be delimiters.

At step 610 one or more words from the communication are stored in the dictionary. Parameters associated with the communication from which the one or more words are derived may also be stored in the dictionary along with the one or more words. The parameters may include any information, data, statistics, features, or descriptions related to the communication including, but not limited to, meta data.

The parameters may be used for sorting and/or prioritizing the dictionary based on, for example, the parameters of the encrypted file. For example, one way the words may be prioritized is based on a sender/recipient pairing. That is, words in the dictionary that were intercepted from communications between the same sender/recipient pair as the encrypted file may be given a higher priority in the dictionary. Each word stored in the dictionary comprises a string of characters set-off by a set of delimiters. The words may include standard English words (e.g., Helicopter), non-English words (e.g., Spanish words, such as Hola), non-words (e.g., %^&&as&65), phrases (e.g., Here's the Password), or any other arrangement and/or collection of characters forming a potential password. Depending on the embodiment, the words may be stored in one or more dictionaries. For example, in some embodiments, the system may maintain a global dictionary for all users of the system and individual dictionaries for each individual user of the system. As another example, the system may maintain a primary dictionary comprising words from all communications sent to a user and secondary dictionaries comprising words from communications sent from a particular sender to the user. These dictionaries may be built over time, each intercepted communication adding to dictionary. In some instances, the dictionary may be purged of older words (e.g., words that were added and/or have not been used in more than a month).

At step 615, priority is associated with the words in the dictionary. The priority associated with the words may be used to sort the words. In some embodiments, because the words are sorted based on the parameters of the encrypted file, the relative priority of the words may be dynamic (e.g., a high priority word for one encrypted file may be a low priority word for another encrypted file). For example, a word from a communication intercepted immediately before communication with the encrypted file may have a relatively high priority. However, the priority of the word may be lower when used to attempting to decrypt a file received several days later. The priority associated with a word may be derived from any of a variety of techniques. For example, in some embodiments, the priority may be derived based on the metadata associated with the words and/or the communication. In such instances, different priorities may be assigned to a word based on who sent the communication, who received the communication, where the communication was routed, how the communication was received, when the communication was received or any other information that may be related to the communication from which the word originated. The priority associated with the word may also be based on the content of the word itself. For example, words comprising a string of characters comprising random punctuation, misspellings, or non-English words may have a higher priority than standard English words found in a traditional English dictionary (assuming the user is an English speaker or the system is configured to be used primarily with English speakers). Another example may be to give a higher priority to words that are set off by unique delimiters (e.g., delimiters other than spaces) or are otherwise distinguished (e.g., underlined) from the other words of the message.

At step 620 an encrypted file is received. For purposes of this example, the encrypted file is received as part of the intercepted communication. In other embodiments, the encrypted file may be received independent of the intercepted communication. For example, the encrypted file may be received from an FTP site or from a user's storage medium (e.g., a flashdrive). In certain scenarios, the user may send the file to the security system independent of any communications received by the communications system. In addition, steps 600-615 may be repeated any number of times before or after the encrypted file is received at step 620. In some embodiments, the type of the file may be determined.

At step 625 it is determined whether the encrypted file is password protected. This may be accomplished by analyzing the extension of the file and/or by examining a header of the file. This step may be performed by items such as file type module 220 of FIG. 2 in various embodiments. If the file is not password protected (e.g., it is encrypted using asymmetric cryptography) then the file may be handled by the system using a different technique and may skip the remaining steps of this method. If the file is password protected then the method continues to steps 630-645 where the encrypted file is decrypted and analyzed for malicious code.

At step 630, the dictionary is sorted based on priority. In certain embodiments, the system may comprise numerous different dictionaries wherein each dictionary is unique to a particular sender, receiver, or sender/receiver pair. Other unique dictionaries may be created for any of a variety of other factors such as the particular departments within the company, or any other natural division of dictionaries which may result in a more focused and refined dictionary. In some instances global dictionaries are maintained. In certain embodiments, before sorting the dictionary, the system may first identify the appropriate dictionary, or a relevant subset of a global dictionary. For example, the words in a dictionary maintained for the intended recipient of the email may be identified. The identified words may then be sorted based on one or more parameters associated with the encrypted file and thus may be unique for each individual encrypted file and/or intercepted communication. For example, where priority information associated with the words includes metadata such as a sender and a receiver of the intercepted communication, the dictionary may be sorted to give a higher priority to words from the same sender/receiver pair. Thus, a different sender/receiver pair would result in a different sorting in the dictionary. As another example, in some scenarios, the dictionary may further be sorted according to a time associated with the intercepted communication. This may prioritize the dictionary such that words in the intercepted communication are of a higher priority than words in communications intercepted before or after the current intercepted communication.

At step 635 the words from a dictionary are applied to the password field of the encrypted file to attempt to decrypt the file. The words are applied from the dictionary based on the sorted priority of the dictionary. That is, the higher priority words are tried before lower priority words. Because the dictionary may have been sorted based on the encrypted file and/or the intercepted communication, it becomes more likely that the password will be found early in the dictionary as opposed to later. This may increase the efficiency of the decryption process by reducing the number of words that are tried.

At step 640 a check is made to determine whether the file has been decrypted. The check may be applied after each word from the dictionary is applied. If the file has not been decrypted, then the method continues to either step 630 or 635 depending on whether or not there are additional words left to be tried from the dictionary. If there are words within the dictionary that have not yet been tried, then the method returns to step 635 where the next highest priority word is applied to the password of the encrypted file. In some scenarios, the system may first use all the words in an individual or secondary dictionary first, and then move on to the global or primary dictionary. If, on the other hand, all the words in all the available dictionaries have been tried, then the method returns to step 630.

In particular embodiments, the method may wait a predetermined amount of time, or wait for a triggering action, before returning to step 630. For example, in some embodiments, the method may wait until after receiving a predetermined number of additional communications (or predetermined number of words are added to the dictionary) before returning to step 630. This may, for example, allow the system to identify passwords in which the sender sends the password after sending the encrypted file. In some embodiments, the system may prompt a user, either the sender or the recipient, for the password. This prompt may be made at any point after determining the file is encrypted. When the method returns to step 630, it may re-sort the updated dictionary and then repeat steps 635 and 640 until the file is decrypted or there are no more words to try. In certain embodiments, only the new words added to the dictionary may be sorted and applied to the encrypted file. In some instances, if after failing to decrypt the file after a predetermined number of attempts (e.g., after returning to step 630 and re-sorting the dictionary three times) the method may determine that it is unable to decrypt the file and send the file on for further processing or alert the user that it was unable to decrypt the file. If the file is decrypted by any of the words from the dictionary then the method continues to step 645. In some embodiments, upon identifying the password, the system may simply return a message indicating it has identified the password and provide the system with the password. The system may then decrypt the file and process it accordingly.

At step 645 the system determines whether the decrypted file contains malicious code. This determination may be made using any of a variety of malicious code detection techniques. The intercepted communication may then be processed in any of a variety of ways after it has been determined whether or not the decrypted file contains malicious code. For example, if the file is free of malicious code the file may be sent on to the intended recipient. As another example, if the file contains malicious code or is suspected of containing malicious code, the file may be removed, sanitized or cleaned, quarantined, and/or sent for review by human analysts. In some embodiments, actions such as removing attachments from messages may be performed by the system and the modified message may be sent back to a mail server or agent for delivery or an edited message may be sent by the system. As another example, if the system was being used as a service by another entity (such as a desktop or network security agent), a report may be sent to the entity that may include the adjudication as well as the results from the detection nodes.

While the steps illustrated in FIG. 6 are depicted and described in a fairly linear manner, depending on the embodiment and/or scenario, one or more of the steps may be performed in parallel with one or more other steps or multiple instances of the same step may be running in parallel with each other. For example, if multiple communications are intercepted at the same time, the words from those communications may be identified and stored in parallel. As another example, when an encrypted file is received, multiple dictionaries may be used in parallel to attempt to identify the password. In certain embodiments or scenarios, more than one type of decryption technique may be applied to the encrypted file in parallel with the technique discussed above with respect to FIG. 6. When any one of the parallel techniques determines the password, the other techniques may stop.

In general, the steps illustrated in FIG. 6 may be repeated for any intercepted communication and/or received encrypted file. In addition, in general, the steps illustrated in FIG. 6 may be combined, modified, or deleted where appropriate, and additional steps may also be added to the example operation. Furthermore, the described steps may be performed in any suitable order. In some embodiments, the steps described above may be performed by any suitable combination of the elements discussed above with respect to FIGS. 1-5. While it was assumed for purposes of explanation of the flowchart that the file to be decrypted was received as an email attachment, the steps described above may be performed for any encrypted file. For example, a user may have downloaded a file via the internet or the user may have an encrypted file on a disk, CD flash drive, or other such storage media. In such an instance, the file may be received at step 620 without updating the dictionary in steps 600-615.

The embodiments that this disclosure (including all attachments hereto) describes or illustrates are examples, and they do not limit the scope of this disclosure. This disclosure encompasses all changes, substitutions, variations, alterations, and modifications to the example embodiments herein that a person having ordinary skill in the art would comprehend. Modifications, additions, or omissions may be made to the systems and apparatuses disclosed herein without departing from the scope of this disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising tangibly stored software, hardware, and/or other encoded logic. As used in this document, "each" refers to each member of a set or each member of a subset of a set. Modifications, additions, or omissions may be made to the methods disclosed herein without departing from the scope of this disclosure. The method may include more, fewer, or other steps. Additionally, steps may be performed in any suitable order.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic. In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A computer-implemented method for execution by one or more processors, the method comprising:

intercepting at least one first communication comprising a first message and an associated first encrypted file, wherein the first encrypted file is configured to be decrypted using a password;

parsing the first message to identify one or more words from within the first message;

creating a dictionary for words to use to decrypt the first encrypted file;

storing in the dictionary the one or more identified words parsed from within the first message of the first communication, the dictionary comprising a plurality of words from a plurality of intercepted communications;

storing in the dictionary meta data associated with parameters associated with the first communication from which the one or more words identified by parsing the first message and stored in the dictionary;

using the meta data to prioritize the words stored in the dictionary;

identifying one or more of the prioritized words from the dictionary to be used to decrypt the first encrypted file; and applying the one or more of the prioritized words identified from the dictionary to decrypt the first encrypted file using at least a portion of the one or more prioritized words identified from the dictionary as the password for decrypting the first encrypted file.

2. The method of claim 1, further comprising sorting the one or more prioritized words based on the meta data such that a first word used to attempt to decrypt the first encrypted file is more likely to be the password than a subsequent word used to attempt to decrypt the first encrypted file.

3. The method of claim 1, further comprising:

intercepting a second communication comprising a second message, wherein the first encrypted file is configured to be decrypted using a password;

parsing the second message to identify one or more words from within the second message;

storing in the dictionary the one or more identified words parsed from within the second message of the second communication with the one or more words of the first message;

storing in the dictionary meta data associated with parameters associated with the second message from which the one or more words identified by parsing the first message and stored in the dictionary;

using the meta data to prioritize the words stored in the dictionary;

identifying one or more of the prioritized words from the dictionary to be used to attempt to decrypt the second encrypted file; and applying the one or more of the prioritized words identified from the dictionary to decrypt the second encrypted file using at least a portion of the one or more prioritized words identified from the dictionary as the password for decrypting the second encrypted file.

4. The method of claim 3, further comprising applying the one or more of the prioritized words identified from the dictionary to decrypt the second encrypted file using at least a portion of the one or more prioritized words identified from the dictionary as the password for decrypting the second encrypted file.

5. The method of claim 1, wherein storing in the dictionary one or more words parsed from within the first message of the first communication comprises searching the first message for delimiters indicating a start and a stop for a string of characters forming the word to be stored in the dictionary.

6. The method of claim 1, wherein the dictionary is associated with an intended recipient of the intercepted first communication.

7. The method of claim 1, further comprising, in response to successfully decrypting the first encrypted file, analyzing the first decrypted file to determine whether the first decrypted file contains malicious code.

8. The method of claim 1, further comprising:

determining that none of the words in the dictionary are able to decrypt the first encrypted file;

waiting to store at least one additional word in the dictionary; and applying the one or more of the prioritized words identified from the dictionary to decrypt the first encrypted file using the at least one additional word from the dictionary as the password for decrypting of the first encrypted file.

9. The method of claim 1, further comprising sorting the one or more prioritized words identified based on a priority level associated with the one or more words, wherein a non-English dictionary word has a higher priority level than a word found in an English dictionary.

10. The method of claim 1, further comprising sorting the one or more prioritized words identified based on a priority level associated with the one or more words, wherein a word distinguished from the other words of the first message has a higher priority level than a word not distinguished from the other words.

11. The method of claim 1:

wherein the first communication has a communication date associated therewith and the first encrypted file has a file data associated therewith; and further comprising sorting the one or more prioritized words identified based on a priority level associated with the one or more words, wherein the priority level associated with a word increases as a date associated with the first communication is closer to the first date.

12. The method of claim 1, further comprising, upon failing to decrypt the first encrypted file using at least a portion of the one or more words from the dictionary, prompting a user for the password used to decrypt the first encrypted file.

13. The method of claim 1, further comprising sorting the one or more prioritized words identified based on a sender and a recipient associated with the first encrypted file.

14. A system for decrypting a file, comprising:

an interface configured to intercept a first communication comprising a first message and an associated first encrypted file, wherein the first encrypted file is configured to be decrypted using a password;

a processor coupled to the interface and configured to:

parse the first message to identify one or more words from within the first message;

create a dictionary for words to use to decrypt the first encrypted file;

store in the dictionary the one or more identified words parsed from within the first message of the first communication, the dictionary comprising a plurality of words from a plurality of intercepted communications; and store in the dictionary meta data associated with parameters associated with the first communication from which the one or more words identified by parsing the first message and stored in the dictionary;

use the meta data to prioritize the words stored in the dictionary;

identify one or more of the prioritized words from the dictionary to be used to attempt to the first encrypted file; and applying the one or more of the prioritized words identified from the dictionary to decrypt the first encrypted file using at least a portion of the one or more prioritized words identified from the dictionary as the password for decrypting the first encrypted file.

15. The system of claim 14, wherein the processor is further configured to sort the one or more prioritized words based on the meta data such that a first word used to attempt to decrypt the first encrypted file is more likely to be the password than a subsequent word used to attempt to decrypt the first encrypted file.

16. The system of claim 14, wherein:
the interface is further configured to intercept a second communication comprising a second message, wherein the first encrypted file is configured to be decrypted using a password;
the processor is further configured to:
parse the second message to identify one or more words from within the second message;
store in the dictionary the one or more identified words parsed from within the second message of the second communication with the one or more words of the first message; and
store in the dictionary meta data associated with parameters associated with the second message from which the one or more words identified by parsing the first message and stored in the dictionary;
use the meta data to prioritize the words stored in the dictionary;
identify one or more of the prioritized words from the dictionary to be used to attempt to decrypt the second encrypted file; and
applying the one or more of the prioritized words identified from the dictionary to decrypt the second encrypted file using at least a portion of the one or more prioritized words identified from the dictionary as the password for decrypting the second encrypted file.

17. The system of claim 14, wherein the processor configured to store in the dictionary one or more words parsed from within the first message of the first communication comprises searching the first message for delimiters indicating a start and a stop for a string of characters forming the word to be stored in the dictionary.

18. The system of claim 14, wherein the dictionary is associated with an intended recipient of the intercepted first communication.

19. The system of claim 14, wherein the processor, m response to successfully decrypting the first encrypted file, is further configured to analyze the first decrypted file to determine whether the first decrypted file contains malicious code.

20. The system of claim 14, wherein the processor is further configured to:
determine that none of the words in the dictionary are able to decrypt the first encrypted file;
wait to store at least one additional word in the dictionary; and
applying the one or more of the prioritized words identified from the dictionary to decrypt the first encrypted file using the at least one additional word from the dictionary as the password for decrypting of the first encrypted file.

21. The system of claim 14, wherein the processor is further configured to sort the one or more identified words based on a priority level associated with the one or more words, wherein a non-English dictionary word has a higher priority level than a word found in an English dictionary.

22. The system of claim 14, wherein the processor is further configured to sort the one or more prioritized words identified based on a priority level associated with the one or more words, wherein a word distinguished from the other words of the first message has a higher priority level than a word not distinguished from the other words.

23. The system of claim 14, wherein:
the first communication has a communication date associated therewith and the first encrypted file has a file data associated therewith; and
the processor is further configured to sort the one or more prioritized words identified based on a priority level associated with the one or more words, wherein the priority level associated with a word increases as a date associated with the first communication is closer to the first date.

24. A non-transitory computer-readable storage media comprising instructions that when executed by a processor cause the processor to perform operations for decrypting a file, the operations being arranged to:
intercept a first communication comprising a first message and an associated first encrypted file, wherein the first encrypted file is configured to be decrypted using a password;
parse the first message to identify one or more words from within the first message;
create a dictionary for words to use to decrypt the first encrypted file;
store in the dictionary the one or more identified words from within the first message of the first communication, the dictionary comprising a plurality of words from a plurality of intercepted communications;
store in the dictionary meta data associated with parameters associated with the first communication from which the one or more words identified by parsing the first message and stored in the dictionary;
identify one or more of the prioritized words from the dictionary to be used to attempt to the first encrypted file; and
applying the one or more of the prioritized words identified from the dictionary to decrypt the first encrypted file using at least a portion of the one or more prioritized words identified from the dictionary as the password for decrypting the first encrypted file.

25. The media of claim 24, wherein the operations being further arranged to sort the one or more prioritized words based on the meta data such that a first word used to attempt to decrypt the first encrypted file is more likely to be the password than a subsequent word used to attempt to decrypt the first encrypted file.

26. The media of claim 24, wherein the operations being further arranged to:
intercept a second communication comprising a second message, wherein the first encrypted file is configured to be decrypted using a password;
parse the second message to identify one or more words from within the second message;
store in the dictionary the one or more identified words parsed from within the second message of the second communication with the one or more words of the first message;
store in the dictionary meta data associated with parameters associated with the second message from which the one or more words identified by parsing the first message and stored in the dictionary;
use the meta data to prioritize the words stored in the dictionary;
identify one or more of the prioritized words from the dictionary to be used to attempt to decrypt the second encrypted file; and
applying the one or more of the prioritized words identified from the dictionary to decrypt the second encrypted file using at least a portion of the one or more prioritized words identified from the dictionary as the password for decrypting the second encrypted file.

27. The media of claim 24, wherein the operations being further arranged to store in the dictionary one or more words parsed from within the first message of the first communication comprises logic arranged to search the first message for delimiters indicating a start and a stop for a string of characters forming the word to be stored in the dictionary.

28. The media of claim 24, wherein the dictionary is associated with an intended recipient of the intercepted first communication.

29. The media of claim 24, wherein the operations being further arranged to, in response to successfully decrypting the first encrypted file, analyze the first decrypted file to determine whether the first decrypted file contains malicious code.

30. The media of claim 24, wherein the operations being further arranged to:
   determine that none of the words in the dictionary are able to decrypt the first encrypted file;
   wait to store at least one additional word in the dictionary; and
   applying the one or more of the prioritized words identified from the dictionary to decrypt the first encrypted file using the at least one additional word from the dictionary as the password for decrypting of the first encrypted file.

31. The media of claim 24, wherein the operations being further arranged to sort the one or more prioritized words identified based on a priority level associated with the one or more words, wherein a non-English dictionary word has a higher priority level than a word found in an English dictionary.

32. The media of claim 24, wherein the operations being further arranged to sort the one or more prioritized words identified based on a priority level associated with the one or more words, wherein a word distinguished from the other words of the first message has a higher priority level than a word not distinguished from the other words.

33. The media of claim 24:
   wherein the first communication has a communication date associated therewith and the first encrypted file has a file data associated therewith; and
   wherein the operations being further arranged to sort the one or more prioritized words identified based on a priority level associated with the one or more words, wherein the priority level associated with a word increases as a date associated with the first communication is closer to the first date.

* * * * *

UNITED STATES PATENT AND TRADEMARK OFFICE
CERTIFICATE OF CORRECTION

PATENT NO. : 8,787,567 B2  
APPLICATION NO. : 13/031948  
DATED : July 22, 2014  
INVENTOR(S) : McDougal et al.

Page 1 of 1

It is certified that error appears in the above-identified patent and that said Letters Patent is hereby corrected as shown below:

In the Specification,

In column 3, line 45, before "network", insert --external--, therefor

In column 10, line 34, before "policy", insert --ingest--, therefor

In column 11, line 21, delete "system" and insert --module--, therefor

In column 12, line 10, delete "Subsystem" and insert --Detection subsystem--, therefor In column 12, line 63, before "nodes", insert --detection--, therefor In column 13, line 1, before "subsystem", insert --detection--, therefor In column 13, line 38, after "scanning)" insert --.--, therefor In column 13, line 58, before "nodes", insert --detection--, therefor (Second occurrence)

In column 18, line 53, after "monitor", insert --module--, therefor

In column 22, line 54, after "data", delete "¶", therefor

In the Claims,

In column 29, line 37, in Claim 19, delete "m" and insert --in--, therefor

Signed and Sealed this  
Eighteenth Day of November, 2014

Michelle K. Lee  
*Deputy Director of the United States Patent and Trademark Office*